United States Patent
Hwang

(10) Patent No.: US 11,572,053 B1
(45) Date of Patent: Feb. 7, 2023

(54) METHOD AND DEVICE FOR CONTROLLING VEHICLE INCLUDING CONTINUOUSLY VARIABLE TRANSMISSION

(71) Applicants: Hyundai Motor Company, Seoul (KR); Kia Corporation, Seoul (KR)

(72) Inventor: Jin Young Hwang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/865,100

(22) Filed: Jul. 14, 2022

(30) Foreign Application Priority Data

Dec. 9, 2021 (KR) .......................... 10-2021-0175713

(51) Int. Cl.
| | |
|---|---|
| *B60W 10/06* | (2006.01) |
| *F16H 59/44* | (2006.01) |
| *F16H 59/46* | (2006.01) |
| *F16H 59/48* | (2006.01) |
| *F16H 61/14* | (2006.01) |
| *F02D 41/02* | (2006.01) |
| *B60W 10/107* | (2012.01) |
| *B60W 10/02* | (2006.01) |
| *F16H 61/662* | (2006.01) |

(52) U.S. Cl.
CPC .......... *B60W 10/06* (2013.01); *B60W 10/026* (2013.01); *B60W 10/107* (2013.01); *F02D 41/0215* (2013.01); *F16H 59/44* (2013.01); *F16H 59/46* (2013.01); *F16H 59/48* (2013.01); *F16H 61/14* (2013.01); *F16H 61/66272* (2013.01); *B60W 2510/107* (2013.01); *B60W 2520/10* (2013.01); *B60W 2520/105* (2013.01); *B60W 2520/28* (2013.01); *B60W 2710/024* (2013.01); *B60W 2710/0666* (2013.01); *B60W 2710/1083* (2013.01); *B60W 2720/10* (2013.01); *B60Y 2300/28* (2013.01)

(58) Field of Classification Search
None
See application file for complete search history.

(56) References Cited

U.S. PATENT DOCUMENTS

| | | | | |
|---|---|---|---|---|
| 10,527,166 | B1 * | 1/2020 | Hwang | ............... F16H 61/0021 |
| 10,527,167 | B2 * | 1/2020 | Hwang | ............. F16H 61/66272 |
| 2015/0073671 | A1 * | 3/2015 | Inoue | .................... B60W 10/10 |
| | | | | 701/54 |

* cited by examiner

*Primary Examiner* — Timothy Hannon
(74) *Attorney, Agent, or Firm* — Morgan, Lewis & Bockius LLP

(57) ABSTRACT

A method for controlling a vehicle including a continuously variable transmission includes determining, by a controller, whether a speed difference between a speed of a vehicle according to revolutions per minute (RPM) of a driving wheel of the vehicle and a speed of the vehicle according to revolutions per minute (RPM) of a towed wheel of the vehicle is equal to or greater than a speed reference value and reducing, by the controller, torque of an engine providing a driving force to a driving pulley of the continuously variable transmission when the difference in vehicle speed is equal to or greater than the speed reference value.

19 Claims, 2 Drawing Sheets

METHOD AND DEVICE FOR CONTROLLING VEHICLE INCLUDING CONTINUOUSLY VARIABLE TRANSMISSION

CROSS-REFERENCE TO RELATED APPLICATION

The present application claims priority to Korean Patent Application No. 10-2021-0175713 filed on Dec. 9, 2021, the entire contents of which is incorporated herein for all purposes by this reference.

BACKGROUND OF THE PRESENT DISCLOSURE

Field of the Present Disclosure

The present disclosure relates to a vehicle including a continuously variable transmission, and more particularly, to a method and device configured for controlling a vehicle including a continuously variable transmission.

Description of Related Art

Transmissions of vehicles have a function of transmitting a rotation force of an engine to driving wheels. These transmissions include a manual transmission in which a driver directly selects a shifting stage at the driver's will, an automatic transmission in which shifting is performed automatically according to driving conditions of a vehicle, and a continuously variable transmission in which shifting is continuously performed without a specific shift region between each shifting stage.

The continuously variable transmission is a transmission which may achieve a continuous transmission gear ratio by use of a belt instead of a gear, and is abbreviated as CVT.

The continuously variable transmission is a transmission implementing a transmission gear ratio based on a change in a diameter of a driving pulley and a change in a diameter of a driven pulley in accordance with a driven pulley pressure input to the driven pulley and a driving pulley pressure input to the driving pulley and transmitting power between the driving pulley and the driven pulley through friction of a belt.

In the continuously variable transmission, a diameter of a driving pulley and a diameter of a driven pulley are changed to provide a transmission gear ratio, and a hydraulic pressure supplied to change the diameter of the driving pulley and the driven pulley is supplied by operation of a solenoid valve and a spool valve.

The continuously variable transmission utilizes a line pressure (or pump pressure) as a source pressure of a driven pulley pressure and a driving pulley pressure, and the line pressure is controlled by combining a solenoid valve or a spool valve.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and device configured for controlling a vehicle including a continuously variable transmission having advantages of preventing damage to a belt included in a continuously variable transmission and damage to a driving pulley and a driven pulley connected to the belt when the continuously variable transmission operates at a low temperature (e.g., −10° C. or less).

According to various exemplary embodiments of the present disclosure, a method for controlling a vehicle including a continuously variable transmission includes: determining, by a controller, whether a speed difference between a speed of a vehicle according to revolutions per minute (RPM) of a driving wheel of the vehicle and a speed of the vehicle according to revolutions per minute (RPM) of a towed wheel of the vehicle is equal to or greater than a speed reference value; and reducing, by the controller, torque of an engine providing a driving force to a driving pulley of the continuously variable transmission when the speed difference is equal to or greater than the speed reference value.

The controller may reduce the torque of the engine when the speed difference is equal to or greater than the speed reference value and an acceleration of the vehicle is equal to or greater than an acceleration reference value.

The controller may increase a first safety value for a hydraulic pressure supplied to the driving pulley and a second safety value for a hydraulic pressure supplied to a driven pulley connected to the driving pulley through a belt when the speed difference is equal to or greater than the speed reference value, and the first safety value of the hydraulic pressure may be a hydraulic pressure preventing an occurrence of slip of the driving pulley, and the second safety value of the hydraulic pressure may be a hydraulic pressure preventing an occurrence of slip of the driven pulley.

When the speed difference is equal to or greater than the speed reference value, the controller may turn off a damper clutch included in a torque converter of the continuously variable transmission.

The method for controlling a vehicle including a continuously variable transmission may further include: determining, by the controller, whether a difference value in pressure between a current pressure of a flow path for supplying oil to the driving pulley and a target pressure of the flow path for supplying oil to the driving pulley according to a driving state of the vehicle is equal to or less than a first pressure reference value and whether a difference value in pressure between a current pressure of a flow path for supplying oil to the driven pulley and a target pressure of the flow path for supplying oil to the driven pulley according to the driving state of the vehicle is equal to or less than a second pressure reference value, when the controller concludes that the speed difference between the speed of the vehicle according to the RPM of the driving wheel of the vehicle and the speed of the vehicle according to the RPM of the towed wheel of the vehicle is less than the speed reference value; and returning, by the controller, torque of the engine of the vehicle to torque before the reduced torque of the engine when the difference value in pressure between the current pressure of the flow path for supplying oil to the driving pulley and the target pressure of the flow path for supplying oil to the driving pulley according to the driving state of the vehicle is equal to or less than the first pressure reference value and when the difference value in pressure between the current pressure of the flow path for supplying oil to the driven pulley and the target pressure of the flow path for supplying oil to the driven pulley according to the driving state of the vehicle is equal to or less than the second pressure reference value.

When the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller may decrease the first safety value of the increased hydraulic pressure to a value before the first safety value was increased and decrease the second safety value of the increased hydraulic pressure to a value before the second safety value was increased.

When the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller may turn on the damper clutch.

According to various exemplary embodiments of the present disclosure, a device configured for controlling a vehicle including a continuously variable transmission includes: a temperature sensor configured for detecting a temperature of oil of the continuously variable transmission included in the vehicle; and a controller configured for determining whether a speed difference between a speed of the vehicle determined according to revolutions per minute (RPM) of a driving wheel of the vehicle and a speed of the vehicle determined according to revolutions per minute (RPM) of a towed wheel of the vehicle is equal to or greater than a speed reference value, wherein when the speed difference is equal to or greater than the speed reference value, the controller may reduce torque of an engine providing a driving force to a driving pulley of the continuously variable transmission.

The controller may reduce the torque of the engine when the speed difference is equal to or greater than the speed reference value and an acceleration of the vehicle is equal to or greater than an acceleration reference value.

The controller may increase a first safety value for a hydraulic pressure supplied to the driving pulley and a second safety value for a hydraulic pressure supplied to a driven pulley connected to the driving pulley through a belt when the speed difference is equal to or greater than the speed reference value, and the first safety value of the hydraulic pressure may be a hydraulic pressure preventing an occurrence of slip of the driving pulley, and the second safety value of the hydraulic pressure may be a hydraulic pressure preventing an occurrence of slip of the driven pulley.

When the speed difference is equal to or greater than the speed reference value, the controller may turn off a damper clutch included in a torque converter of the continuously variable transmission.

When the speed difference between the speed of the vehicle according to the RPM of the driving wheel of the vehicle and the speed of the vehicle according to the RPM of the towed wheel of the vehicle is less than the speed reference value, the controller may be configured to determine whether a difference value in pressure between a current pressure of a flow path for supplying oil to the driving pulley and a target pressure of the flow path for supplying oil to the driving pulley according to a driving state of the vehicle is equal to or less than a first pressure reference value and whether a difference value in pressure between a current pressure of a flow path for supplying oil to the driven pulley and a target pressure of the flow path for supplying oil to the driven pulley according to the driving state of the vehicle is equal to or less than a second pressure reference value, and when the difference value in pressure between the current pressure of a flow path for supplying oil to the driving pulley and the target pressure of the flow path for supplying oil to the driving pulley according to the driving state of the vehicle is equal to or less than the first pressure reference value and when the difference value in pressure between the current pressure of the flow path for supplying oil to the driven pulley and the target pressure of the flow path for supplying oil to the driven pulley according to the driving state of the vehicle is equal to or less than the second pressure reference value, the controller may return torque of the engine of the vehicle to torque before the reduced torque of the engine.

When the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller may decrease the first safety value of the increased hydraulic pressure to a value before the first safety value was increased and decrease the second safety value of the increased hydraulic pressure to a value before the second safety value was increased.

When the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller may turn on the damper clutch.

In the method and device configured for controlling a vehicle including a continuously variable transmission according to the exemplary embodiment of the present disclosure described above, when the continuously variable transmission operates at a low temperature (e.g., −10° C. or less), damage to the belt included in the continuously variable transmission and damage to the driving pulley and the driven pulley connected to the belt may be prevented, improving the durability of the continuously variable transmission.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
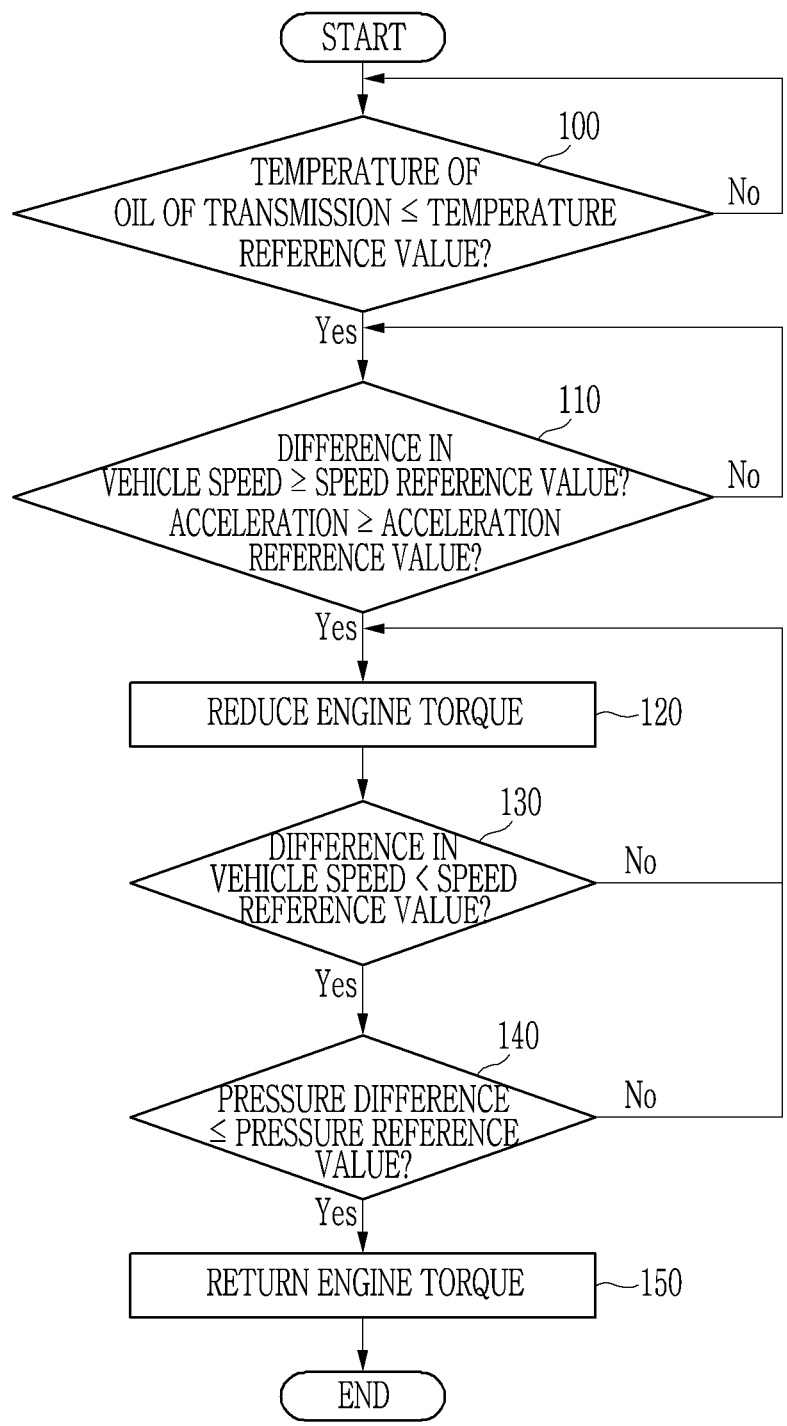
FIG. 1 is a flowchart illustrating a method for controlling a vehicle including a continuously variable transmission according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To fully understand the present disclosure and the objects achieved by the practice of the present disclosure, reference should be made to the accompanying drawings illustrating exemplary embodiments of the present disclosure and the contents described in the accompanying drawings.

Hereinafter, the present disclosure will be described in detail by describing exemplary embodiments of the present disclosure with reference to the accompanying drawings. In describing the present disclosure, if it is determined that a detailed description of a related known configuration or function may obscure the gist of the present disclosure, a detailed description thereof will be omitted. The same reference numbers provided in each drawing may refer to the same components.

The terms used herein are used only to describe specific exemplary embodiments of the present disclosure, and are not intended to limit the present disclosure. The singular expression includes the plural expression unless the context clearly dictates otherwise. In the present specification, the terms such as "include" and "have" are intended to indicate that features, numbers, steps, operations, elements, components, or combinations thereof used in the following description exist and it may be thus understood that the possibility of existence or addition of one or more different features, numbers, steps, operations, elements, components, or combinations thereof is not excluded.

Throughout the specification, a case in which any one part is connected to the other part includes a case in which the parts are directly connected to each other and a case in which the parts are electrically connected to each other with other elements interposed therebetween Unless defined otherwise, terms used herein, including technical or scientific terms, have the same meaning as commonly understood by one of ordinary skill in the art to which an exemplary embodiment of the present disclosure belongs. Unless defined in a different way, all the terms used herein including technical and scientific terms have the same meanings as understood by those skilled in the art to which an exemplary embodiment of the present disclosure pertains. Such terms as defined in generally used dictionaries should be construed to have the same meanings as those of the contexts of the related art, and unless clearly defined in the application, they should not be construed to have ideally or excessively formal meanings.

Continuously variable transmission (CVT), which shifts speed by pulleys connected by a belt, generates a desired transmission gear ratio by controlling pressures of a driving pulley and a driven pulley. In the continuously variable transmission, a shifting stage may be configured as an infinite stage rather than a fixed stage (fixed shifting stage), and thus, the shifting stage of the continuously variable transmission may be optimized to a shifting stage with high efficiency of an engine, improving the fuel efficiency of a vehicle and performance of the vehicle.

However, because the continuously variable transmission transmits engine power to an output shaft of the vehicle through pulleys connected to a belt and controlled by high hydraulic pressure, high control precision is required in the continuously variable transmission.

In cryogenic conditions in which an external temperature of the vehicle is −10° C. or less, a volume of oil in the continuously variable transmission is reduced and viscosity of the oil is increased, so that fluidity of the oil is lowered.

When the vehicle travels on a low-friction road such as an icy road or a snowy road in the cryogenic conditions, a driving wheel of the vehicle slips and rotates at a high speed. Accordingly, revolutions per minute (RPM) of an oil pump connected to an input shaft (or an input shaft of the continuously variable transmission) and included in the continuously variable transmission increases, such that air intake occurs at an oil intake port. The air intake may cause a momentary drop in hydraulic pressure in the driving pulley and the driven pulley of the continuously variable transmission.

As a pressure is reduced to be lower than a target pressure of the driving pulley and the driven pulley, a shock (impact) may occur in the vehicle due to a change in a gear ratio of the continuously variable transmission or a belt or the pulleys connected to the belt may be damaged.

Figure 2:
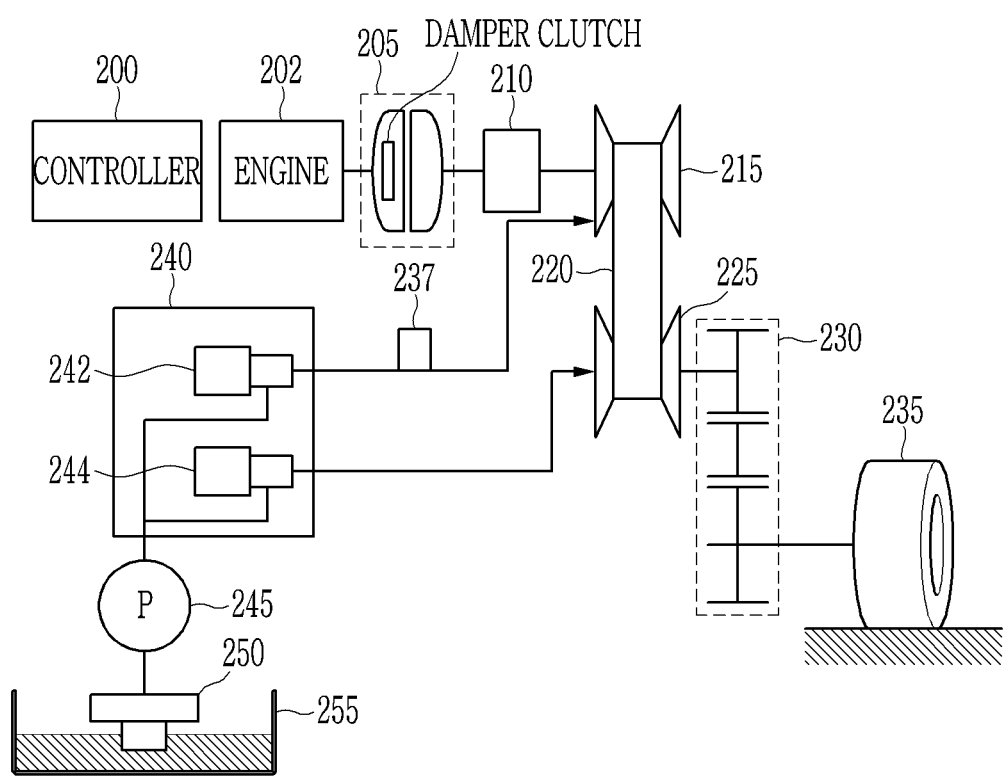
FIG. 2 is a block diagram illustrating a device configured for controlling a vehicle including a continuously variable transmission to which the method for controlling a vehicle including a continuously variable transmission shown in FIG. 1 is applied.

FIG. 1 is a flowchart illustrating a method for controlling a vehicle including a continuously variable transmission according to various exemplary embodiments of the present disclosure. FIG. 2 is a block diagram illustrating a device configured for controlling a vehicle including a continuously variable transmission to which the method for controlling a vehicle including a continuously variable transmission shown in FIG. 1 is applied.

Referring to FIG. 1 and FIG. 2, in a determination step 100, a controller 200 may determine whether a temperature of the continuously variable transmission oil (i.e., transmission fluid) is equal to or lower than a temperature reference value (e.g., −10° C.). A temperature sensor 237 of the vehicle may detect the temperature of the oil of the continuously variable transmission and provide information related to the detected temperature of the oil to the controller 200 and may be provided in, for example, a flow path of the continuously variable transmission for supplying oil to a driving pulley 215. For example, a temperature reference value may be stored in a memory of the vehicle and may be determined by a test (or experiment).

Oil of the continuously variable transmission may be supplied to the driving pulley 215 and the driven pulley 225 to adjust a width of the driving pulley and the driven pulley. The determination step 100 may be a step for determining whether the continuously variable transmission operates at a low temperature. At low temperatures, a volume of the oil in the continuously variable transmission may be reduced and viscosity of the oil is high, so that the fluidity of the oil may be reduced.

As shown in FIG. 2, the vehicle may include a controller 200, an engine 202 providing a driving force to the driving pulley 215 of the continuously variable transmission, a torque converter 205 converting torque using a fluid to transmit power, a clutch (or a planetary gear device) 210 transmitting or blocking torque of the engine 202, the driving pulley 125, a belt 220 connecting the driving pulley 215 and a driven pulley 225 to transmit power, a driven pulley 225, a power output device 230 including an output shaft (main shaft) and a gear, a driving wheel 235, a temperature sensor 237, a valve body 240, an oil pump 245, an oil intake port 250 including an oil filter, and an oil pan (an oil storage) 255. The torque converter 205, the clutch 210, the driving pulley 215, the belt 220, the driven pulley 225, the valve body 240, the oil pump 245, the oil intake port 250, and the oil pan 255 may form the continuously variable transmission. The torque converter 205, clutch 210, driving pulley 215, belt 220, driven pulley 225, valve body 240, oil pump 245, oil inlet 250, and oil pan (255) may form a continuously variable transmission. The continuously variable transmission may move the driving pulley 215 and the driven pulley 225 in an axial direction by controlling hydraulic pressure supplied to the driving pulley 215 and the driven pulley 225, continuously changing a transmission gear ratio through a change in a diameter of a contact surface between the belt and each pulley. The device configured for controlling a vehicle including a continuously variable transmission may include a controller 200 and a temperature sensor 237.

A valve body 240 may include a driving pulley solenoid valve 242 supplying oil to the driving pulley 215 in response to a control signal from the controller 200 and a driven pulley solenoid valve 244 supplying oil to the driven pulley 215 in response to a control signal from the controller 200. The continuously variable transmission (CVT) performing shifting by the driving pulley 215 and the driven pulley 225 connected by the belt 200 may generate a desired transmission gear ratio by controlling pressures of the driving pulley and the driven pulley.

The controller 200 may control an overall operation of the vehicle, as an electronic control unit (ECU). The controller 200 may be, for example, one or more microprocessors operated by a program (a control logic) or hardware (e.g., a microcomputer) including the one or more microprocessors, and the program may include a series of instructions for performing a method for controlling a vehicle including a continuously variable transmission according to various exemplary embodiments of the present disclosure. The command may be stored in the memory of the vehicle.

According to step 110 illustrated in FIG. 1, when a temperature of oil of the continuously variable transmission is equal to or less than a temperature reference value, the controller 200 may determine whether a difference in vehicle speed between a speed of the vehicle according to an RPM of a driving wheel of the vehicle and a speed of the vehicle according to an RPM of a towed wheel (i.e., driven wheel or non-driving wheel) of the vehicle is equal to or greater than a speed reference value (e.g., 5 kph). Step 110 may be a step for the vehicle to determine slip of the driving wheel on a low-friction road such as an icy road or a snowy road. For example, a speed reference value may be stored in the memory of the vehicle and determined by a test (or experiment). In another exemplary embodiment of the present disclosure, the controller 200 may determine whether an acceleration of the vehicle is equal to or greater than an acceleration reference value. An acceleration sensor of the vehicle may detect an acceleration of the vehicle and provide the detected acceleration to the controller 200. For example, an acceleration reference value may be stored in the memory of the vehicle and determined by a test (or experiment).

According to step 120, when the difference in the vehicle speed is greater than or equal to the speed reference value and the acceleration of the vehicle is equal to or greater than the acceleration reference value, the controller 200 may reduce torque of the engine 202 of the vehicle. When a temperature of the oil of the transmission is lowered, a reduced value of the torque of the engine 202 may increase.

In another exemplary embodiment of the present disclosure, when the difference in the vehicle speed is equal to or greater than the speed reference value or when the difference in the vehicle speed is greater than or equal to the speed reference value and the acceleration of the vehicle is greater than or equal to the acceleration reference value, the controller 200 may increase a first safety value (safety factor) for the hydraulic pressure (control pressure) supplied to the driving pulley 215 and a second safety value for the hydraulic pressure supplied to the driven pulley 225. When the temperature of the oil of the transmission is lowered, a safety value of the hydraulic pressure may increase. The first safety value of the hydraulic pressure may be a hydraulic pressure for preventing an occurrence of slip of the driving pulley 215, and the second safety value of the hydraulic pressure may be a hydraulic pressure for preventing an occurrence of slip of the driven pulley 225. The first safe value of the hydraulic pressure and the second safe value of the hydraulic pressure may be stored in the memory of the vehicle and determined by a test (or experiment). For example, the second safety value of the hydraulic pressure may be the same as the first safety value of the hydraulic pressure. Furthermore, when the safety value is increased, the controller 200 may turn off (disengage) the clutch 210 of the continuously variable transmission at a value less than the increased safety value, so that torque of the engine 202 is not transmitted to the driving pulley 215.

In another exemplary embodiment of the present disclosure, when the difference in the vehicle speed is greater than or equal to the speed reference value and when the acceleration of the vehicle is greater than or equal to the acceleration reference value, the controller 200 may turn off a damper clutch (e.g., a lock-up clutch) included in the torque converter 205 to prevent transmission of a shock occurring when the vehicle moves from a low-friction road to a high-friction road to the driving pulley 215, the driven pulley 225, and the belt 220. The damper clutch may prevent power loss due to hydraulic pressure by directly connecting a fluid clutch inside the torque converter 205 to a flywheel.

According to step 130, after step 120, the controller 200 may determine whether the difference in the vehicle speed between the speed of the vehicle according to the RPM of the driving wheel of the vehicle and the speed of the vehicle according to the RPM of the towed wheel of the vehicle is less than the reference value (e.g., 5 kph). In more detail, in step 130, the controller 200 may determine whether there is no slip of the driving wheel of the vehicle.

When the difference in the vehicle speed between the speed of the vehicle according to the RPM of the driving wheel of the vehicle and the speed of the vehicle according to the RPM of the towed wheel of the vehicle is less than the speed reference value, the process of the method of controlling a vehicle including a continuously variable transmission may proceed to step 140, and when the difference in the vehicle speed between the speed of the vehicle according to the RPM of the driving wheel of the vehicle and the speed of the vehicle according to the RPM of the towed wheel of the vehicle is equal to or greater than the speed reference value, the process of the method for controlling a vehicle including a continuously variable transmission may proceed to step 120.

According to step 140, the controller 200 may determine whether a pressure difference value between a current pressure of a flow path for supplying oil to the driving pulley 215 and a target pressure of the flow path for supplying oil to the driving pulley 215 according to a driving state of the vehicle is equal to or less than a first pressure reference value (e.g., 5 bar) and whether a pressure difference value between a pressure of a flow path for supplying oil to the driven pulley 225 and a target pressure of the flow path for supplying oil to the driven pulley 225 according to a driving state of the vehicle is equal to or less than a second pressure reference value (e.g., 5 bar). In more detail, in step 140, the controller 200 may determine whether air is drawn in through an oil intake port 250. For example, the first pressure reference value and the second pressure reference value may be stored in the memory of the vehicle and determined by a test (or experiment). For example, the second reference pressure value may be the same as the first reference pressure value.

The pressure in the flow path for supplying oil to the driving pulley 215 may be detected by a pressure sensor provided in the flow path for supplying oil to the driving pulley 215 and provided to the controller 200, and pressure in the flow path for supplying oil to the driven pulley 225 may be detected by a pressure sensor provided in the flow path for supplying oil to the driven pulley 225 and provided to the controller 200.

When the pressure difference value between the current pressure of the flow path for supplying oil to the driving pulley 215 and the target pressure of the flow path for supplying oil to the driving pulley 215 according to a driving state of the vehicle is equal to or less than the first pressure reference value and when the pressure difference value between the current pressure of the flow path for supplying oil to the driven pulley 225 and the target pressure of the flow path for supplying oil to the driven pulley 225 according to a driving state of the vehicle is equal to or less than the second pressure reference value, the process of the method for controlling a vehicle including a continuously variable transmission may proceed to step 150, and when the pressure difference value between the current pressure of the flow path for supplying oil to the driving pulley 215 and the target pressure of the flow path for supplying oil to the driving pulley 215 according to a driving state of the vehicle is greater than the first pressure reference value and when the pressure difference value between the current pressure of the flow path for supplying oil to the driven pulley 225 and the target pressure of the flow path for supplying oil to the driven pulley 225 according to a driving state of the vehicle is greater than the second pressure reference value, the process of the method for controlling a vehicle including a continuously variable transmission may proceed to step 120.

According to step 150, the controller 200 may restore (increase) the torque of the engine 202 of the vehicle to the torque before the reduced torque of the engine. In another exemplary embodiment of the present disclosure, the controller 200 may lower (reduce or restore) the first safety value of the increased hydraulic pressure to a value before the first safety value was increased, and may decrease the second safety value of the increased hydraulic pressure to a value before the second safety value was increased. In another exemplary embodiment of the present disclosure, the controller 200 may turn on (return or engage) the damper clutch included in the torque converter 205 so that the torque converter may be controlled to be directly connected.

The components or "unit", "device", blocks or modules used in exemplary embodiments of the present disclosure as illustrated in FIG. 1 and FIG. 2 may be implemented by software components, such as tasks, classes, subroutines, processes, objects, execution threads, or programs, or by hardware components, such as field programmable gate array (FPGA) or application specific integrated circuit (ASIC), or by combinations of the software and hardware components. The components or "unit" may be included in a computer-readable storage medium, or parts of the components may be distributed at a plurality of computers.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium having such software or commands stored thereon and executable on the apparatus or the computer.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a vehicle including a continuously variable transmission, the method comprising:
   determining, by a controller, whether a speed difference between a speed of the vehicle determined according to revolutions per minute (RPM) of a driving wheel of the vehicle and a speed of the vehicle determined according to revolutions per minute (RPM) of a towed wheel of the vehicle is equal to or greater than a speed reference value; and
   reducing, by the controller, torque of an engine providing a driving force to a driving pulley of the continuously variable transmission when the speed difference is equal to or greater than the speed reference value.

2. The method of claim 1, wherein the controller is configured to reduce the torque of the engine when the speed difference is equal to or greater than the speed reference value and an acceleration of the vehicle is equal to or greater than an acceleration reference value.

3. The method of claim 2,
   wherein when the speed difference is equal to or greater than the speed reference value and the acceleration of the vehicle is greater than or equal to the acceleration reference value,
   the controller is configured to increase a first safety value for a hydraulic pressure supplied to the driving pulley and a second safety value for a hydraulic pressure supplied to a driven pulley connected to the driving pulley through a belt, and
   wherein the first safety value of the hydraulic pressure is a hydraulic pressure preventing an occurrence of slip of the driving pulley, and the second safety value of the hydraulic pressure is a hydraulic pressure preventing an occurrence of slip of the driven pulley.

4. The method of claim 3, wherein when the speed difference is equal to or greater than the speed reference value, the controller is configured to turn off a damper clutch included in a torque converter of the continuously variable transmission.

5. The method of claim 1,
   wherein when the speed difference is equal to or greater than the speed reference value, the controller is configured to increase a first safety value for a hydraulic pressure supplied to the driving pulley and a second safety value for a hydraulic pressure supplied to a driven pulley connected to the driving pulley through a belt, and
   wherein the first safety value of the hydraulic pressure is a hydraulic pressure preventing an occurrence of slip of the driving pulley, and the second safety value of the hydraulic pressure is a hydraulic pressure preventing an occurrence of slip of the driven pulley.

6. The method of claim 5, wherein when the speed difference is equal to or greater than the speed reference value, the controller is configured to turn off a damper clutch included in a torque converter of the continuously variable transmission.

7. The method of claim 6, further including:
   determining, by the controller, whether a difference value in pressure between a current pressure of a flow path for supplying oil to the driving pulley and a target pressure of the flow path for supplying oil to the driving pulley according to a driving state of the vehicle is equal to or less than a first pressure reference value and whether a difference value in pressure between a current pressure of a flow path for supplying oil to the driven pulley and a target pressure of the flow path for supplying oil to the driven pulley according to the driving state of the vehicle is equal to or less than a second pressure reference value, when the controller concludes that the speed difference between the speed of the vehicle according to the RPM of the driving wheel of the vehicle and the speed of the vehicle according to the RPM of the towed wheel of the vehicle is less than the speed reference value; and
   returning, by the controller, torque of the engine of the vehicle to torque before the reduced torque of the engine when the controller concludes that the difference value in pressure between the current pressure of the flow path for supplying oil to the driving pulley and the target pressure of the flow path for supplying oil to the driving pulley according to the driving state of the vehicle is equal to or less than the first pressure reference value and when the controller concludes that the difference value in pressure between the current pressure of the flow path for supplying oil to the driven pulley and the target pressure of the flow path for supplying oil to the driven pulley according to the driving state of the vehicle is equal to or less than the second pressure reference value.

8. The method of claim 7, wherein when the controller concludes that the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller is configured to decrease the first safety value of the increased hydraulic pressure to a value before the first safety value was increased and to decrease the second safety value of the increased hydraulic pressure to a value before the second safety value was increased.

9. The method of claim 8,
wherein when the controller concludes that the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller is configured to turn on the damper clutch.

10. A non-transitory computer readable storage medium on which a program for performing the method of claim 1 is recorded.

11. A apparatus for controlling a vehicle including a continuously variable transmission, the apparatus comprising:
a temperature sensor configured for detecting a temperature of oil of the continuously variable transmission included in the vehicle; and
a controller electrically connected to the temperature sensor and configured for determining whether a speed difference between a speed of the vehicle determined according to revolutions per minute (RPM) of a driving wheel of the vehicle and a speed of the vehicle determined according to revolutions per minute (RPM) of a towed wheel of the vehicle is equal to or greater than a speed reference value,
wherein when the speed difference is equal to or greater than the speed reference value, the controller is configured to reduce torque of an engine providing a driving force to a driving pulley of the continuously variable transmission.

12. The apparatus of claim 11, wherein the controller is configured to reduce the torque of the engine when the speed difference is equal to or greater than the speed reference value and an acceleration of the vehicle is equal to or greater than an acceleration reference value.

13. The apparatus of claim 12,
wherein when the controller concludes that the speed difference is equal to or greater than the speed reference value and the acceleration of the vehicle is greater than or equal to the acceleration reference value,
the controller is configured to increase a first safety value for a hydraulic pressure supplied to the driving pulley and a second safety value for a hydraulic pressure supplied to a driven pulley connected to the driving pulley through a belt, and
wherein the first safety value of the hydraulic pressure is a hydraulic pressure preventing an occurrence of slip of the driving pulley, and the second safety value of the hydraulic pressure is a hydraulic pressure preventing an occurrence of slip of the driven pulley.

14. The apparatus of claim 13, wherein when the speed difference is equal to or greater than the speed reference value, the controller is configured to turn off a damper clutch included in a torque converter of the continuously variable transmission.

15. The apparatus of claim 11,
wherein the controller is configured to increase a first safety value for a hydraulic pressure supplied to the driving pulley and a second safety value for a hydraulic pressure supplied to a driven pulley connected to the driving pulley through a belt when the speed difference is equal to or greater than the speed reference value, and
wherein the first safety value of the hydraulic pressure is a hydraulic pressure preventing an occurrence of slip of the driving pulley, and the second safety value of the hydraulic pressure is a hydraulic pressure preventing an occurrence of slip of the driven pulley.

16. The apparatus of claim 15, wherein when the speed difference is equal to or greater than the speed reference value, the controller is configured to turn off a damper clutch included in a torque converter of the continuously variable transmission.

17. The apparatus of claim 16, wherein
when the controller concludes that the speed difference between the speed of the vehicle according to the RPM of the driving wheel of the vehicle and the speed of the vehicle according to the RPM of the towed wheel of the vehicle is less than the speed reference value, the controller is configured to determine whether a difference value in pressure between a current pressure of a flow path for supplying oil to the driving pulley and a target pressure of the flow path for supplying oil to the driving pulley according to a driving state of the vehicle is equal to or less than a first pressure reference value and whether a difference value in pressure between a current pressure of a flow path for supplying oil to a driven pulley and a target pressure of the flow path for supplying oil to the driven pulley according to the driving state of the vehicle is equal to or less than a second pressure reference value, and
when the controller concludes that the difference value in pressure between the current pressure of the flow path for supplying oil to the driving pulley and the target pressure of the flow path for supplying oil to the driving pulley according to the driving state of the vehicle is equal to or less than the first pressure reference value and when the controller concludes that the difference value in pressure between the current pressure of the flow path for supplying oil to the driven pulley and the target pressure of the flow path for supplying oil to the driven pulley according to the driving state of the vehicle is equal to or less than the second pressure reference value, the controller is configured to return torque of the engine of the vehicle to torque before the reduced torque of the engine.

18. The apparatus of claim 17, wherein
when the controller concludes that the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller is configured to decrease the first safety value of the increased hydraulic pressure to a value before the first safety value was increased and to decrease the second safety value of the increased hydraulic pressure to a value before the second safety value was increased.

19. The apparatus of claim 18, wherein
when the controller concludes that the difference value in pressure between the current pressure of the flow path for supplying oil to the driving pulley and the target pressure of the flow path for supplying oil to the driving pulley according to the driving state of the vehicle is equal to or less than the first pressure reference value and the difference value in pressure between the current pressure of the flow path for supplying oil to the driven pulley and the target pressure of the flow path for supplying oil to the driven pulley according to the driving state of the vehicle is equal to or less than the second pressure reference value, the controller is configured to turn on the damper clutch.

* * * * *